United States Patent
Asano

(10) Patent No.: US 8,290,659 B2
(45) Date of Patent: Oct. 16, 2012

(54) INFORMATION UPDATING METHOD OF VEHICLE-MOUNTED CONTROL APPARATUS, UPDATE INFORMATION COMMUNICATION SYSTEM, VEHICLE-MOUNTED CONTROL APPARATUS, AND INFORMATION MANAGEMENT BASE STATION APPARATUS

(75) Inventor: Seiji Asano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1186 days.

(21) Appl. No.: 10/582,853

(22) PCT Filed: Dec. 15, 2003

(86) PCT No.: PCT/JP03/16039
§ 371 (c)(1),
(2), (4) Date: Jun. 14, 2006

(87) PCT Pub. No.: WO2005/059862
PCT Pub. Date: Jun. 30, 2005

(65) Prior Publication Data
US 2007/0100513 A1 May 3, 2007

(51) Int. Cl.
*G06F 17/00* (2006.01)
(52) U.S. Cl. .............. 701/31.4; 701/31.5; 701/34.2; 701/34.4; 340/905; 340/988
(58) Field of Classification Search ............ 701/117, 701/120, 200, 201, 2; 340/989; 717/168
See application file for complete search history.

(56) References Cited

U.S. PATENT DOCUMENTS

| | | | | |
|---|---|---|---|---|
| 4,534,061 A | * | 8/1985 | Ulug | 455/17 |
| 4,791,571 A | * | 12/1988 | Takahashi et al. | 701/117 |
| 5,299,132 A | * | 3/1994 | Wortham | 455/457 |
| 5,519,621 A | * | 5/1996 | Wortham | 455/457 |
| 6,178,378 B1 | * | 1/2001 | Leibold | 701/533 |
| 6,222,463 B1 | * | 4/2001 | Rai | 340/928 |
| 6,294,988 B1 | * | 9/2001 | Shomura | 340/438 |
| 6,317,060 B1 | * | 11/2001 | Jones | 340/994 |
| 6,356,833 B2 | * | 3/2002 | Jeon | 701/93 |
| 6,430,488 B1 | * | 8/2002 | Goldman et al. | 701/36 |
| 6,438,468 B1 | * | 8/2002 | Muxlow et al. | 701/3 |
| 6,542,794 B2 | * | 4/2003 | Obradovich | 701/1 |
| 6,587,759 B2 | * | 7/2003 | Obradovich et al. | 701/1 |
| 6,604,033 B1 | * | 8/2003 | Banet et al. | 701/33.2 |

(Continued)

FOREIGN PATENT DOCUMENTS
EP 0 999 099 A2 5/2000

(Continued)

OTHER PUBLICATIONS
Supplementary European Search Report dated Dec. 20, 2007 (three (3) pages).

(Continued)

*Primary Examiner* — Thomas Black
*Assistant Examiner* — Wae Louie
(74) *Attorney, Agent, or Firm* — Crowell & Moring LLP

(57) ABSTRACT

When an updating event occurs, an information management base station unit inquires all the vehicles under its management about the presence or absence of vehicle-mounted control units to be updated. Based on replies from the individual vehicles, the information management base station unit selects the vehicles to be updated, and then it automatically updates them via wireless communication.

15 Claims, 13 Drawing Sheets

U.S. PATENT DOCUMENTS

| | | | | |
|---|---|---|---|---|
| 6,618,668 | B1 * | 9/2003 | Laird | 701/454 |
| 6,629,029 | B1 * | 9/2003 | Giles | 701/31.4 |
| 6,694,359 | B1 * | 2/2004 | Morris et al. | 709/219 |
| 6,741,927 | B2 * | 5/2004 | Jones | 701/465 |
| 6,763,299 | B2 * | 7/2004 | Jones | 701/465 |
| 6,766,244 | B2 * | 7/2004 | Obata et al. | 701/467 |
| 6,813,503 | B1 * | 11/2004 | Zillikens et al. | 455/457 |
| 6,826,726 | B2 * | 11/2004 | Hsing et al. | 715/234 |
| 6,879,908 | B2 * | 4/2005 | Takenaga | 701/420 |
| 6,904,359 | B2 * | 6/2005 | Jones | 701/517 |
| 6,970,783 | B2 * | 11/2005 | Knockeart et al. | 701/469 |
| 7,283,047 | B2 * | 10/2007 | Culpepper et al. | 340/539.13 |
| 7,292,844 | B2 * | 11/2007 | Dowling et al. | 455/414.3 |
| 7,417,559 | B1 * | 8/2008 | Janke | 340/905 |
| 7,899,610 | B2 * | 3/2011 | McClellan | 701/115 |
| 2001/0046854 | A1 * | 11/2001 | Henry et al. | 455/419 |
| 2007/0100513 | A1 * | 5/2007 | Asano | 701/2 |

FOREIGN PATENT DOCUMENTS

| | | | |
|---|---|---|---|
| JP | 62-038624 | | 2/1987 |
| JP | 02-212951 | | 8/1990 |
| JP | 03-243025 | | 10/1991 |
| JP | 05-012000 | | 1/1993 |
| JP | 06-033828 | | 2/1994 |
| JP | 06-204931 | | 7/1994 |
| JP | 09-331579 | | 12/1997 |
| JP | 2000-134669 | A | 5/2000 |
| JP | 2002-044742 | | 2/2002 |
| JP | 2002-144983 | | 5/2002 |
| JP | 2002-144983 | A * | 5/2002 |
| JP | 2002-202895 | A | 7/2002 |
| JP | 2002-202895 | A * | 7/2002 |
| WO | WO 02/10908 | A2 | 2/2002 |
| WO | WO 03/003200 | A1 | 1/2003 |

OTHER PUBLICATIONS

Japanese Office Action dated Jan. 20, 2009 (two (2) pages).
Japanese Office Action dated Sep. 9, 2008 (two (2) pages).
Partial English translation of Japanese document JP 9-331579 A filed on Jun. 14, 2006.
Partial English translation of Japanese document JP 2002-202895 A filed on Apr. 17, 2009.
English translation of Japanese Office Action dated Sep. 9, 2008, which was filed on Nov. 20, 2008.
English translation of Japanese Office Action dated Jan. 20, 2009, which was filed on Apr. 17, 2009.

* cited by examiner

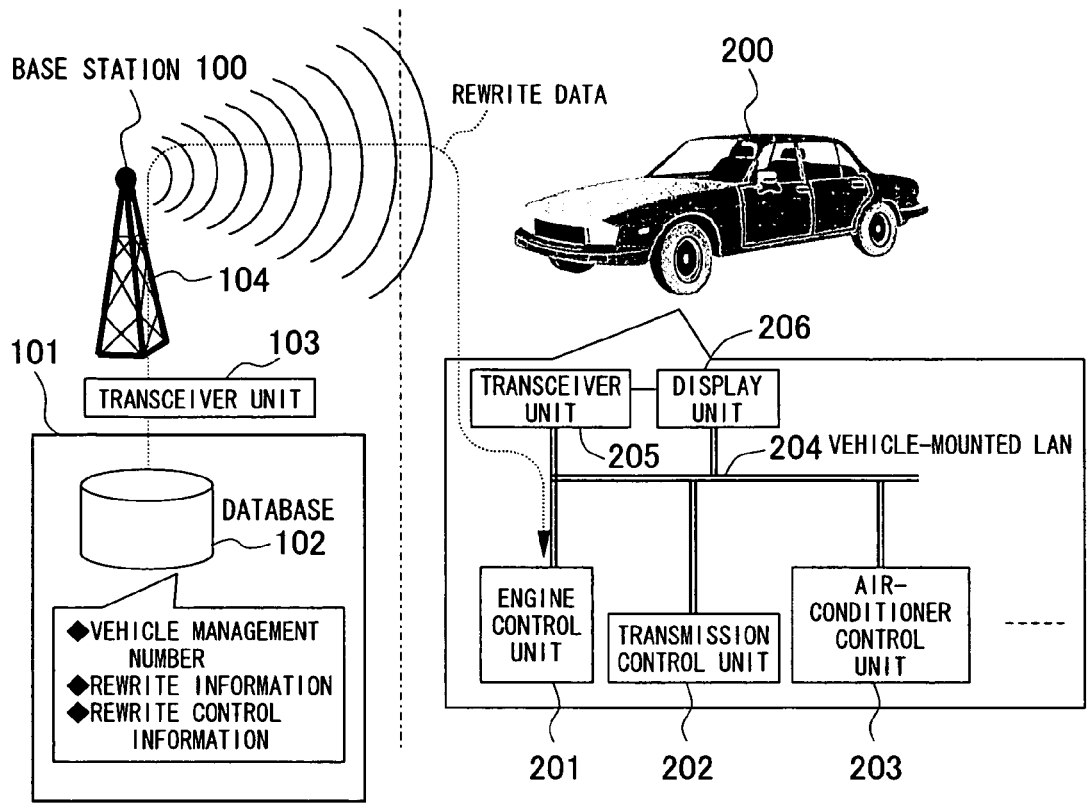

INFORMATION UPDATING METHOD OF VEHICLE-MOUNTED CONTROL APPARATUS, UPDATE INFORMATION COMMUNICATION SYSTEM, VEHICLE-MOUNTED CONTROL APPARATUS, AND INFORMATION MANAGEMENT BASE STATION APPARATUS

TECHNICAL FIELD

The present invention relates to an information updating method for a control unit mounted in a vehicle such as an automobile, an update information communication system, a vehicle-mounted control unit, and an information management base station unit. More specifically, it relates to an information updating method for carrying out update services for, for example, vehicle-mounted computer programs used for controlling a vehicle, an update information communication system for carrying out such information update, an information management base station unit used in the update information communication system, and a vehicle-mounted control unit.

BACKGROUND ART

As a vehicle-mounted electronic control unit (computer) for carrying out, for example, the engine control and transmission control of a vehicle such as an automobile, a system is known in which vehicle-type-specific programs and various forms of data necessary for vehicle control can be rewritten via serial communication, with the use of a rewritable nonvolatile storage means such as EEPROM, the data of which can be rewritten with an external device via a serial communication interface (JP Patent Publication (Kokai) No. 6-33828 A (1994), for example).

Further, a system for operating vehicle-mounted control units is proposed in which a server at an information management center and a communication terminal connected to a vehicle-mounted control unit are able to communicate bidirectionally with one another via a wide area communication network such as a public telephone network. In the system, the vehicle-mounted control unit issues a program transmission request to the information management center. The information management center selects a relevant program from its server and transmits it to the communication terminal. The vehicle-mounted control unit loads the program received by the communication terminal and records the program in a rewritable nonvolatile storage means (JP Patent Publication (Kokai) No. 2002-44742 A, for example).

In the above system for operating vehicle-mounted control units, programs and the like of the vehicle-mounted control unit of a target vehicle can be updated without transporting the vehicle to a dealer for an update. However, since the update is initiated at the intention of the vehicle user, a burden is placed on the vehicle user. Thus, there may be cases in which the vehicle-mounted control unit is not maintained in its optimum state due to user-side problems, for example, such as when the user either forgets to or decides not to update. Additionally, manufacturers and dealers need to inform many users of the need for program modification and update via postcard, e-mail, or the like whenever such need arises.

The present invention has been made in consideration of the above problems. It is an object of the invention to improve the efficiency of updating of programs and data in vehicle-mounted equipment. Specifically, it is an object of the invention to provide an information updating method for a vehicle-mounted control unit, an update information communication system, a vehicle-mounted control unit, and an information management base station unit for providing an updating service whereby the update of programs and data in vehicle-mounted devices can be carried out without placing a burden on vehicle users and without the manufacturers or dealers notifying the users of the need for program modification or update via postcard, e-mail, or the like every time such need arises. In this way, the failure to update the vehicle-mounted control unit due to user-side problems can be completely eliminated and the vehicle-mounted control unit can be always maintained in its optimum state.

DISCLOSURE OF THE INVENTION

The invention provides an information updating method for a vehicle-mounted control unit. In the method, when an updating event occurs, an information management base station unit inquires all the vehicles under its management about the presence or absence of vehicle-mounted control units to be updated and selects the vehicles that need updating based on the replies from the individual vehicles, so as to update the vehicles via wireless communication.

Further, the invention provides another information updating method for vehicle-mounted control units. In the method, information relating to an information update is transmitted from the information management base station unit via wireless communication that is received by a vehicle, and whether or not the information update is necessary for the vehicle is determined at the vehicle end based on the received information. Then, the determination result is transmitted from the vehicle to the information management base station unit. If the received information is necessary for the vehicle, update information is transmitted from the information management base station unit to the vehicle via wireless communication, and the information concerning the vehicle-mounted control unit is rewritten.

The invention provides an update information communication system. In the system, the information management base station unit and the vehicle can bidirectionally and wirelessly communicate with each other. When an updating event occurs, the information management base station unit inquires all the vehicles under its management about the presence or absence of vehicle-mounted control units to be updated and selects the vehicles that need updating based on the replies from the individual vehicles, so as to update the vehicles via wireless communication.

The invention further provides another update information communication system. In the system, the information management base station unit and the vehicle can bidirectionally and wirelessly communicate with each other. Information relating to an information update is transmitted from the information management base station unit via wireless communication and the vehicle receives the information. Then, whether or not the information update is necessary for the vehicle is determined at the vehicle end based on the received information, and the determination result is transmitted from the vehicle to the information management base station unit. If the received information is necessary for the vehicle, update information is transmitted from the information management base station unit to the vehicle via wireless communication, and the information about the vehicle-mounted control unit is rewritten.

In the update information communication system according to the invention, the information for the reprogramming includes programs in the vehicle-mounted control units and data such as control constants. Further, the information transmitted from the information management base station unit to the vehicle includes management information about the vehicle-mounted control unit.

In the update information communication system according to the invention, the time for reprogramming programs and data in the vehicle-mounted control unit is limited depending on the vehicle state. Particularly, the time for reprogramming programs and data in the vehicle-mounted control unit can be limited to when the vehicle is parked and not in operation.

In the update information communication system according to the invention, the information management base station unit includes a database in which update information and vehicle information for a plurality of types of vehicles are stored, and it selects specific update information from the database based on the vehicle information.

Also, the invention provides an information management base station unit capable of bidirectionally communicating with the vehicle wirelessly. When an updating event occurs, the information management base station unit inquires all the vehicles under its management about the presence or absence of vehicle-mounted control units to be updated and selects the vehicles that need updating based on the replies from the individual vehicles, so as to carry out updating for the vehicles via wireless communication.

Also, the invention provides a vehicle-mounted control unit capable of bidirectionally communicating with the information management base station wirelessly. The vehicle-mounted unit determines whether it is a vehicle-mounted control unit to be updated in response to an inquiry regarding update from the information management base station unit and transmits a determination result to the information management base station unit, so as to carry out updating based on the update information transmitted from the information management base station unit.

Thus, in the information updating method for vehicle-mounted control units, the update information communication system, the vehicle-mounted control unit, and the information management base station unit, a request for reprogramming programs, data, and the like, an identifier of the target vehicle, and an identifier of the target control unit mounted in the target vehicle are transmitted from a place that is distant from the vehicle wirelessly or the like. The vehicle end receives the reprogramming request, determines whether the reprogramming is possible, and sends back the result. If a reprogramming OK determination is received, programs and data for the reprogramming are transmitted, such that the target control unit is rewritten on the vehicle end. Upon completion of the reprogramming, information regarding whether it has been properly completed is sent back. If it has been properly completed, the result is registered and managed in a database separately provided.

In accordance with the information updating method for vehicle-mounted control units, the update information communication system, the vehicle-mounted control unit, and the information management base station unit of the invention, the reprogramming of programs, namely, update is automatically carried out for all the vehicles to be updated in accordance with commands from the information management base station managed by automobile manufacturers and dealers. Thus, the vehicle-mounted control unit is always reliably updated without placing a burden on the vehicle user. As a result, the vehicle-mounted control unit is always maintained in its optimum state or in a better state, which leads to optimum states of operability, fuel consumption, and exhaust gas properties. Furthermore, the invention prevents the vehicle-mounted control unit from being kept in a non-optimum state due to user-side problems, for example, such as when the user either forgets to or decides not to update.

BRIEF DESCRIPTION OF THE DRAWINGS

FIG. 1 shows a diagram for explaining an overview of an update information communication system according to the invention.

FIG. 2 shows an example of the contents of vehicle information registered in a database at a base station end in the update information communication system according to the invention.

BEST MODES FOR CARRYING OUT THE INVENTION

Figure 3:
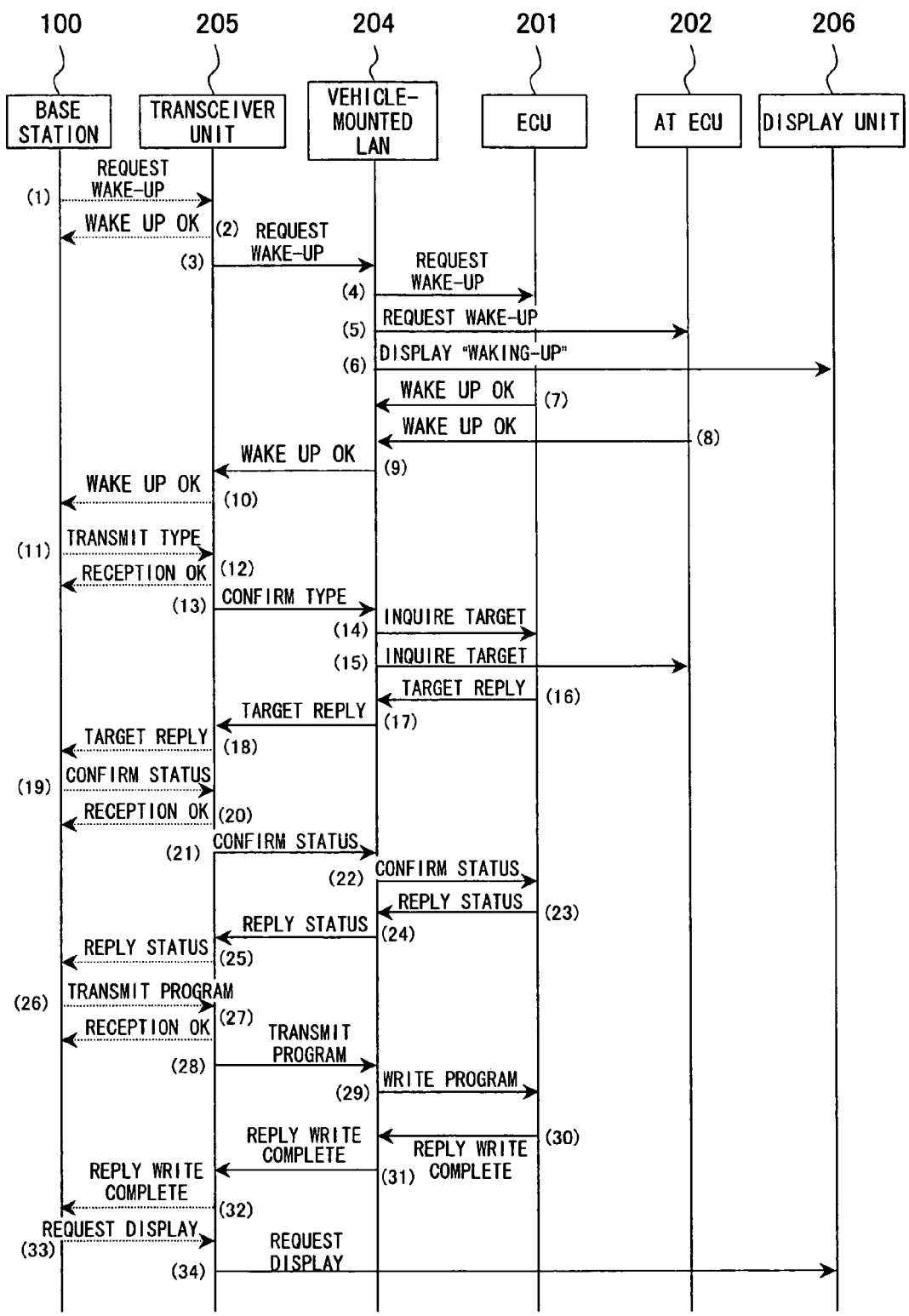
FIG. 3 shows a sequence diagram of an example of a sequence of communication between the base station end and a vehicle end in the update information communication system according to the invention.

Preferred embodiments of the invention will be described with reference to the attached drawings.

FIG. 1 schematically shows an update information communication system for a vehicle-mounted control unit according to an embodiment of the invention.

An information management base station unit 100 (to be hereafter referred to as a base station 100) includes a server 101 having a database 102, a transceiver unit 103 for carrying out mobile communication (wireless communication) via electromagnetic wave, and an antenna 104 for wireless communication.

The server 101 of the base station 100 is installed at the location of an automobile manufacturer, a dealer, or the like. It comprehensively manages programs in vehicle-mounted control units in many vehicles (automobiles) 200 as managed objects, various types of data necessary for controlling the vehicle, and user information. For this comprehensive management, the database 102 in the server 101 stores programs for the vehicle-mounted control units (vehicle-mounted ECU) on all the vehicles to be managed and various types of data necessary for controlling the vehicle by the type of vehicle or the type of vehicle-mounted control units. The database also stores information about the vehicles to be managed (user information) by each vehicle.

The vehicle information stored in the database 102 is specific to each vehicle (user). As shown in FIGS. 2(a) and (b), the vehicle information includes, for each vehicle, a vehicle management number that contains vehicle identification information as well as communication destination information. The vehicle information also includes a management number allocated for each vehicle-mounted control unit on the vehicle-mounted LAN, program version information allocated for each vehicle-mounted control unit, and information concerning the presence or absence of a reprogramming withhold flag indicating the interruption of reprogramming a program.

FIG. 2(a) shows vehicle information about a vehicle A, and FIG. 2(b) shows vehicle information about another vehicle B. In such vehicle information, a control unit 1 is a vehicle-mounted engine control unit 201, and a control unit 2 is a transmission control unit 202, for example.

In the update information communication system, multiple vehicles (automobiles) 200 belong to a single base station 100.

Each of the vehicles 200 includes vehicle-mounted control units such as the electrically-controlled engine control unit (E-ECU) 201, transmission control unit (AT-ECU) 202, and an air-conditioner control unit 203 that are connected via a vehicle-mounted LAN 204 such as CAN (Controller Area Network) such that bidirectional data communication is enabled. The vehicle-mounted LAN 204 is connected to a transceiver unit 205 for carrying out mobile communication (wireless communication) via electromagnetic waves, and a display device 206.

Bidirectional mobile communication (wireless communication) is carried out between the base station 100 and the vehicle 200 under the management thereof for updating information about the vehicle-mounted control units. The mobile communication between the base station 100 and the vehicle 200 is bidirectionally carried out via satellite communication such as S-band satellite communication/broadcasting system, dedicated narrow-band communications systems such as DSRC (Dedicated Short Range Communication), or automobile telephone network (mobile telephone network using public lines).

Each vehicle 200 is passively updated via communication with the base station 100 with respect to data such as the programs of all the vehicle-mounted control units, including the engine control unit 201, the transmission control unit 202, and the air-conditioner control unit 203. Control constants and various parameters necessary for controlling the units are also rewritten.

Namely, when a control program needs updating, for example, a wake-up request message is delivered to the vehicle 200 to be managed as an update request, and then the control program is updated on the initiative of the base station.

When an updating event occurs, the base station 100 inquires about the type of vehicle-mounted control unit to be updated. Namely, it inquires all the vehicles 200 under its management at once about the presence or absence of vehicle-mounted control units to be updated. Vehicles 200 to be updated are selected based on the replies from the individual vehicles, and the vehicles 200 to be updated are updated via wireless communication.

In order not to disturb the driving of the vehicle 200, such update is carried out for vehicles 200 that are parked and not in operation. Namely, update is performed for vehicles 200 to be updated that can be updated without disturbing the driving thereof. Thus, the base station 100 inquires the vehicle 200 requested to be updated and performs updating only when it receives a reply indicating that the vehicle 200 is in an update-allowed state. If the base station 100 receives a reply indicating that the vehicle 200 is not in an update-allowed state, it keeps transmitting the update request (a wake-up requesting message) repeatedly until update is initiated.

In the following, an outline of a sequence of a program/data update information communication between the base station 100 and the vehicle 200 will be described with reference to FIG. 3.

The nodes of the communication sequence are the base station 100, the transceiver unit 205, the vehicle-mounted LAN 204, the E-ECU (engine control unit) 201, the AT-ECT (transmission control unit) 202, and a display unit 206. The transceiver unit 205, the vehicle-mounted LAN 204, the E-ECU 201, the AT-ECU 202, and the display device 206 are at the vehicle 200 end. The base station 100 carries out wireless communication with the transceiver unit 205.

In FIG. 3, the longitudinal direction is the time axis direction, and the communication sequence is sequentially carried out in the order of (1), (2), (3) . . . (34).

(1) The base station 100 transmits a wake-up requesting message to the vehicle-mounted transceiver unit 205.

(2) The vehicle-mounted transceiver unit 205 transmits a reply (ACK: acknowledge) to the wake-up request to the base station 100.

(3) The vehicle-mounted transceiver unit 205 issues a wake-up request to the vehicle-mounted LAN 204.

(4) The vehicle-mounted LAN 204 issues a wake-up request to the E-ECU 201.

(5) The vehicle-mounted LAN 204 issues a wake-up request to the AT-ECU 202.

Thus, the control units (such as the E-ECU 201 and the AT-ECU 205) are woken by the wake-up request from the base station 100 even when the ignition key of the vehicle 100 is switched off.

(6) The vehicle-mounted LAN 204 issues a display request to the display device 206 to indicate that waking-up is underway.

(7) The E-ECU 201 sends a message of completion of wake-up to the vehicle-mounted LAN 204.

(8) The AT-ECU 205 sends a message of completion of wake-up to the vehicle-mounted LAN 204.

(9) A message that all the control units under the vehicle-mounted LAN 204 have been woken up is transmitted to the transceiver unit 205.

(10) Upon receiving the message, the transceiver unit 205 transmits a similar message (completion of wake-up) to the base station 100 end.

(11) Next, the base station 100 end makes an inquiry to the vehicle-mounted transceiver unit 205 about the type of control unit having the target data, such as a program to be rewritten. Namely, the base station 100 end transmits the type data of the control unit to be updated to the vehicle-mounted transceiver unit 205.

(12) The transceiver unit 205 transmits a reply (ACK) that it has received the message regarding the inquiry about the type to the base station 100.

(13) The transceiver unit 205 transmits a type confirmation message to the vehicle-mounted LAN 204.

(14) Upon receiving the type confirmation message, the vehicle-mounted LAN 204 transmits a message to the E-ECU 201 to inquire whether or not it is a target.

(15) The vehicle-mounted LAN 204 also transmits a message to the AT-ECU 202 inquiring whether or not it is a target.

(16) If the E-ECU 201 is a target to be updated, a reply message that the E-ECU 201 is a target is transmitted to the vehicle-mounted LAN 204. This means that it is determined at the vehicle end whether or not a reprogramming is necessary based on information from the base station 100 end.

(17) The vehicle-mounted LAN 204 transmits the reply message (reply from the target) to the transceiver unit 205.

(18) Next, the transceiver unit 205 transmits a target confirmation reply to the base station 100.

(19) Next, the base station 100 transmits a current vehicle status confirmation message to the transceiver unit 205.

(20) The transceiver unit 205 transmits a reply (ACK) to the base station 100 that it has received the status confirmation message.

(21) The transceiver unit 205 transmits a status confirmation requesting message to the vehicle-mounted LAN 204.

(22) Upon receiving the status confirmation requesting message, the vehicle-mounted LAN 204 transmits a current-status confirmation requesting message to the E-ECU 201.

(23) Because the current vehicle status can be recognized by the signals from various switches and sensors fed to the E-ECU 201, the E-ECU 201 detects the current vehicle status based on such signals and transmits a status confirmation result to the vehicle-mounted LAN 204.

(24) Upon receiving a message of the status confirmation result, the vehicle-mounted LAN 204 transmits the message to the transceiver unit 205.

(25) Then, the transceiver unit 205 transmits the message of the status confirmation result to the base station 100.

In the above example of the communication sequence, the status confirmation result is assumed to indicate rewritable status; that is, an update-allowed status.

(26) Upon receiving the status confirmation result (OK result), the base station 100 transmits a reprogramming program to the transceiver unit 205.

(27) Upon receiving the reprogramming program, the transceiver unit 205 transmits an ACK signal indicating proper reception to the base station 100.

(28) If the transceiver unit 205 properly receives the reprogramming program, the transceiver unit 205 transfers the reprogramming program to the vehicle-mounted LAN 204.

(29) A program write command and the reprogramming program are transferred from the vehicle-mounted LAN 204 to the E-ECU 201, so as to reprogramming the program of the E-ECU 201.

(30) Upon completing the reprogramming of the program of the E-ECU 201, the E-ECU 201 transmits a reprogramming completion message to the vehicle-mounted LAN 204.

(31) The vehicle-mounted LAN 204 transmits the reprogramming completion message to the transceiver unit 205.

(32) The transceiver unit 205 transmits the program reprogramming completion message to the base station 100.

(33) Upon confirming the program reprogramming completion message, the base station 100 transmits a message to the transceiver unit 205, giving an instruction (display request) to the vehicle-mounted display device 206 to display a notice of the reprogramming of the program.

(34) When the transceiver unit 205 receives the display request, the display device 206 displays the notice of the reprogramming of the program.

Figure 4:
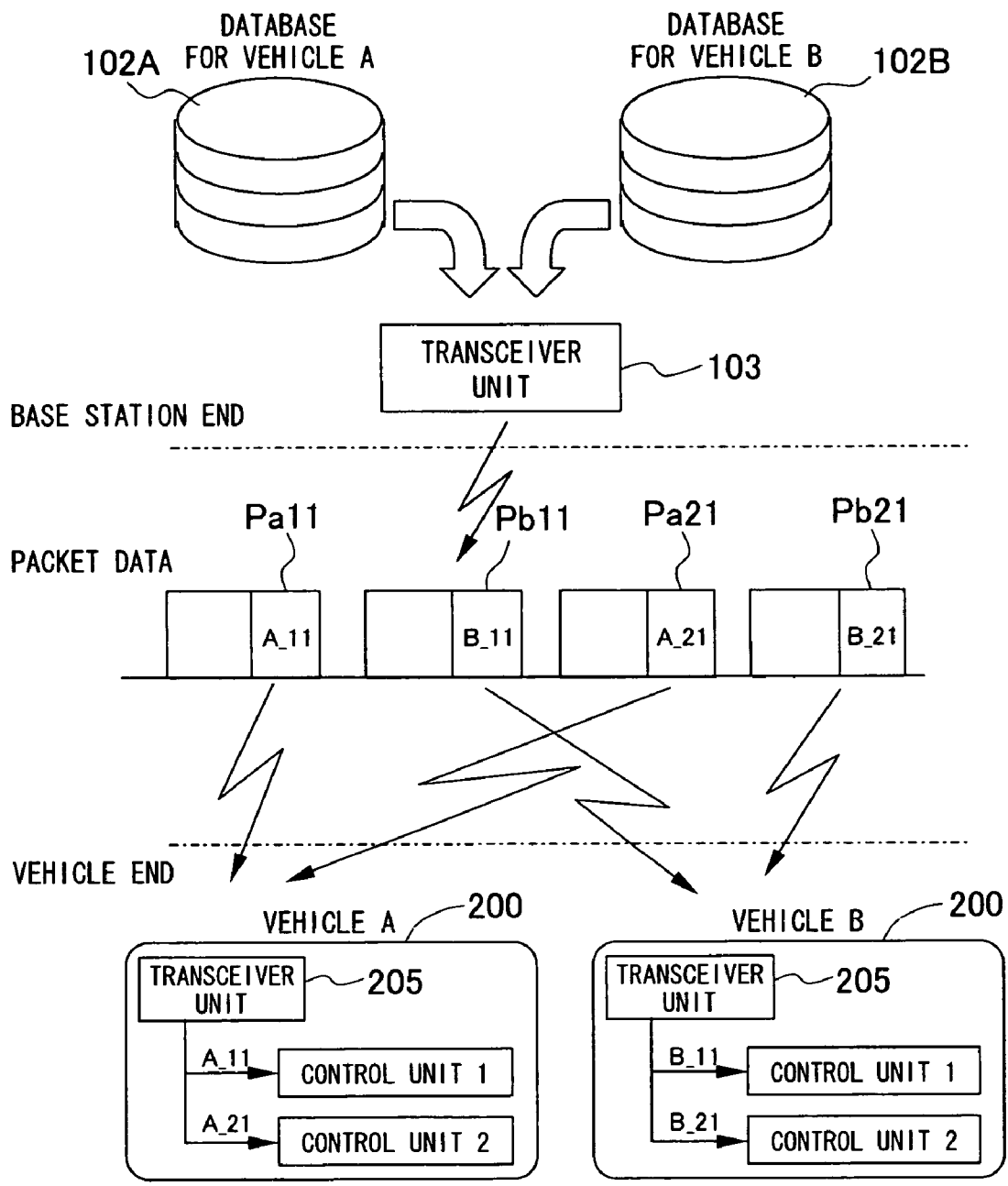
FIG. 4 shows a state of transmission from the base station end to the vehicle end in the update information communication system according to the invention.

In the following, an example of data transmission from the base station 100 end to the vehicle 200 end in an update information communication system for programs and data in vehicle-mounted control units will be described with reference to FIG. 4. FIG. 4 shows a mode of data transmission when the vehicle 200 consists of two types of vehicles A and B.

Respective databases 102A and 102B for the vehicle A and vehicle B, and the transceiver unit 103, are at the base station 100 end. The database 102A manages data concerning the vehicle A and the database 102B manages data concerning the vehicle B.

When programs in the vehicle-mounted control units need to be rewritten, reprogramming programs stored in the databases 102A and 102B are transmitted via the transceiver unit 103.

The reprogramming programs of the vehicle A and the vehicle B are divided into packets such as data Pa11, Pa21, Pb11, and Pb21 before they are transmitted.

The data Pa11 is a single packet of program data of the control unit 1 (E-ECU) in the vehicle A. The data Pb11 is a single packet of program data of the control unit 1 (E-ECU) in the vehicle B. The data Pa21 is a single packet of program data of the control unit 2 (AT-ECU) in the vehicle A. The data Pb21 is a single packet of program data of the control unit 2 (AT-ECU) in the vehicle B.

Figure 5:
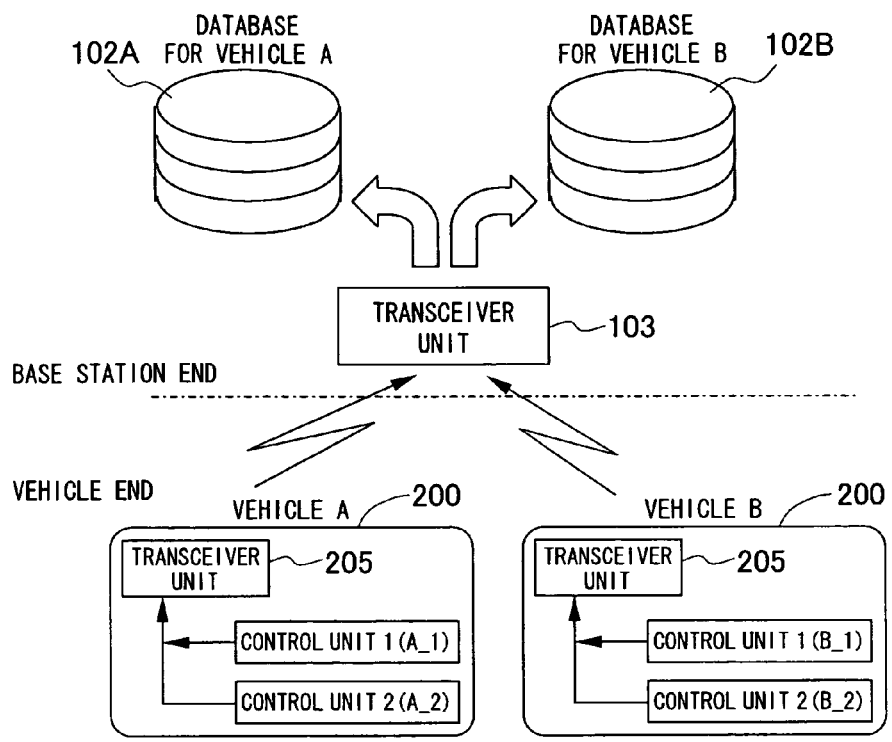
FIG. 5 shows a state of transmission from the vehicle end to the base station end in the update information communication system according to the invention.

The packet data transmitted to the vehicle A is received by the vehicle-mounted transceiver unit 205 and transferred to the respective target control units. Similarly, the packet data transmitted to the vehicle B is received by the vehicle-mounted transceiver unit 205 and transferred to the respective target control units. In the following, an example of data transmission from the vehicle 200 end to the base station 100 end in the update information communication system of the invention for the programs and data of the target vehicle-mounted control unit will be described with reference to FIG. 5.

Upon completing the reprogramming of program data of the control unit 1 and control unit 2 in the vehicle A, reprogramming completion data is transmitted to the vehicle-mounted transceiver unit 205. The transceiver unit 205 transmits the reprogramming completion data to the transceiver unit 103 at the base station 100 end. The reprogramming completion data received by the base station 100 is registered in the database 102A for the vehicle A. The same goes for the vehicle B.

Figure 6:
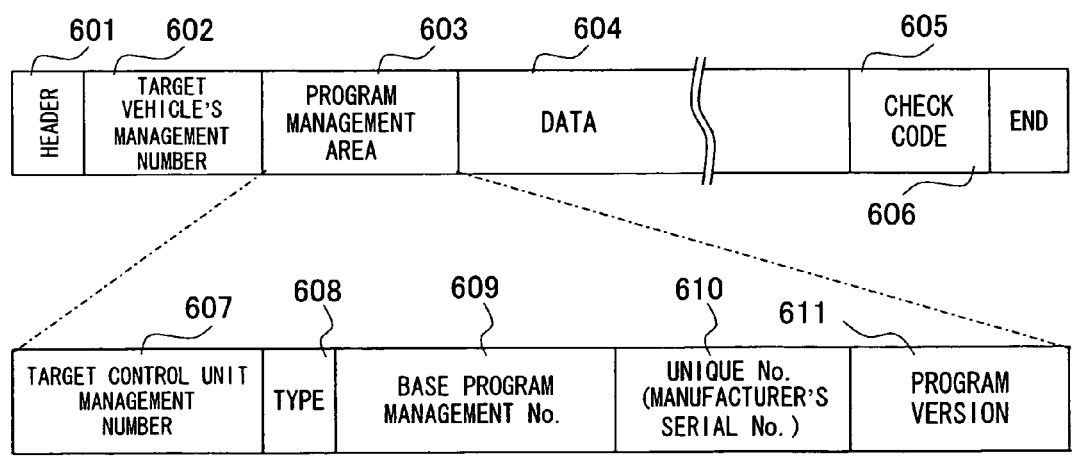
FIG. 6 shows a frame format of an initial program data packet transmitted from the base station end in the update information communication system according to the invention.

FIG. 6 shows an example of a frame format of an initial program data packet transmitted from the base station 100 end in the update information communication system of the invention. The program data packet includes a header 601, a target vehicle's management number area 602, a program management area 603, a data area 604, a check code area 605, and an end mark 606.

The program management area 603 further includes a target control unit management number section 607, a type section 608, a base program management number section 609, a unique number (manufacturer's serial number) section 610, and a program version section 611.

Figure 7:
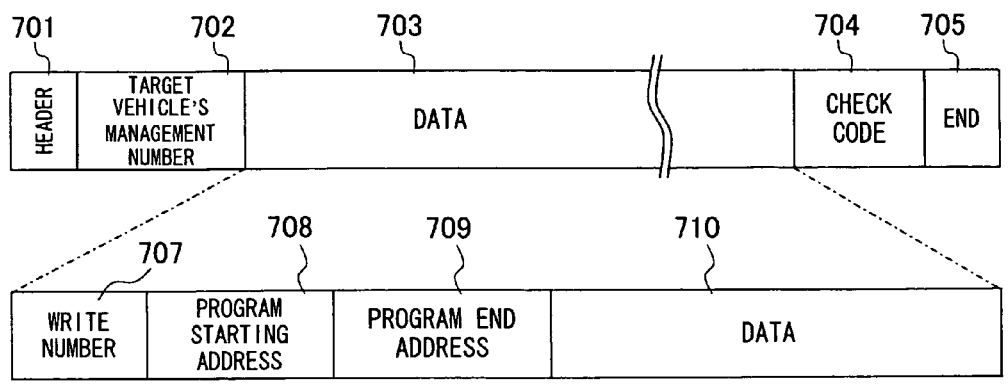
FIG. 7 shows a frame format of a program data packet transmitted after the initial program transmission packet from the base station end in the update information communication system according to the invention.

FIG. 7 shows an example of a frame format of a program data packet transmitted after the initial program data from the base station 100 end in the update information communication system of the invention. The program data packet includes a header 701, a target vehicle's management number area 702, a data area 703, a check code area 704, and an end mark 705.

The data area 703 further includes a write number section 707, a program starting address section 708, a program end address section 709, and a program data section 710.

Figure 8:
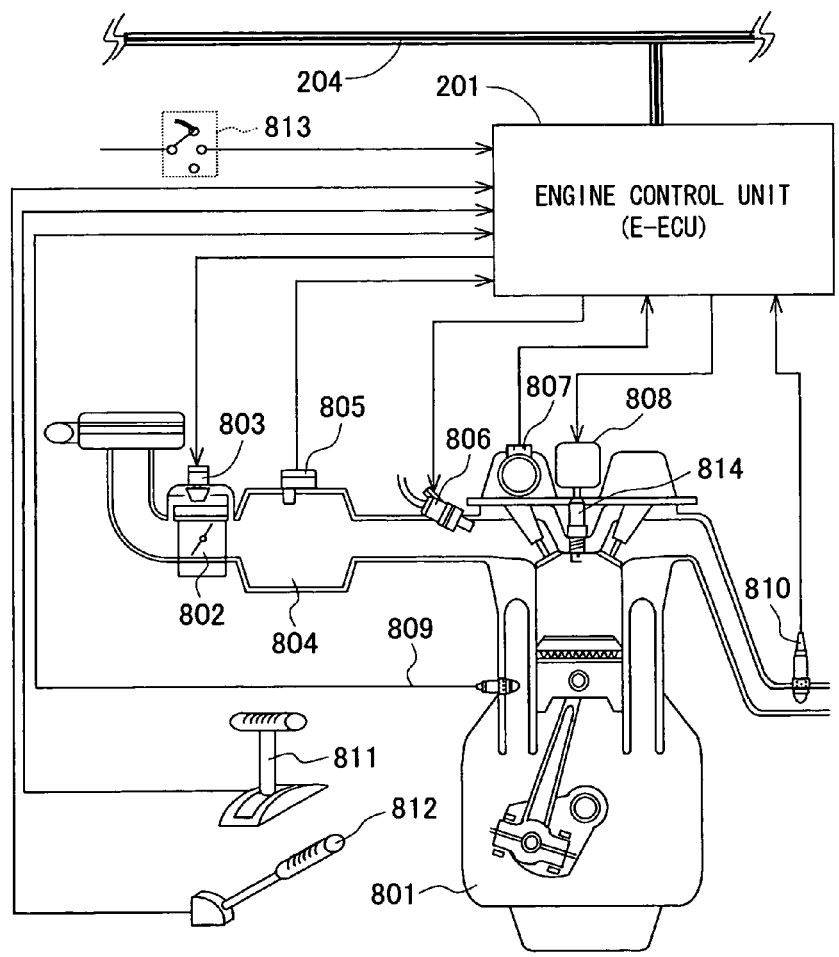
FIG. 8 shows a diagram of a vehicle engine control system in the update information communication system according to the invention.

FIG. 8 shows an example of an engine control system of the engine control unit 201 that is a vehicle-mounted control unit in the vehicle 200.

With regard to an internal combustion engine (to be hereafter referred to as an engine) 801, the mass of intake air is controlled by a throttle valve 802 and an idle speed control valve (ISC) 803 that controls the flow passage area of the flow passage that bypasses the throttle valve 802 and is connected to an intake pipe 804. The intake pipe 804 is connected to an intake manifold pressure sensor 805 for detecting intake pipe pressure.

The engine 801 is fitted with a fuel injection valve 806 for supplying required fuel and a spark plug 814 for igniting a mixture gas comprised of fuel and air supplied to an engine combustion chamber for each cylinder. Further, the engine 801 is connected to an ignition module 808 for supplying ignition energy to the spark plug 814 based on an ignition signal outputted from the engine control unit 201.

The engine control unit 201 controls fuel and ignition based on signals inputted from the intake manifold pressure sensor 805, a crank angle sensor 807, a water temperature sensor 809 for detecting the engine coolant temperature, an oxygen concentration sensor 810, a drive range sensor 811 for detecting the drive range of an automatic transmission, a parking brake switch 812 for detecting the on/off state of a parking brake, and an ignition key switch 813 that is the main switch for operating and stopping the engine 801.

In the present embodiment, while the fuel control is conducted by detecting intake pipe pressure, the fuel control may be conducted by detecting the mass of intake air in the engine.

The engine control unit 201 is connected to the vehicle-mounted LAN 204, which may be a CAN, such that it can transmit and receive data to and from other vehicle-mounted devices.

Figure 9:
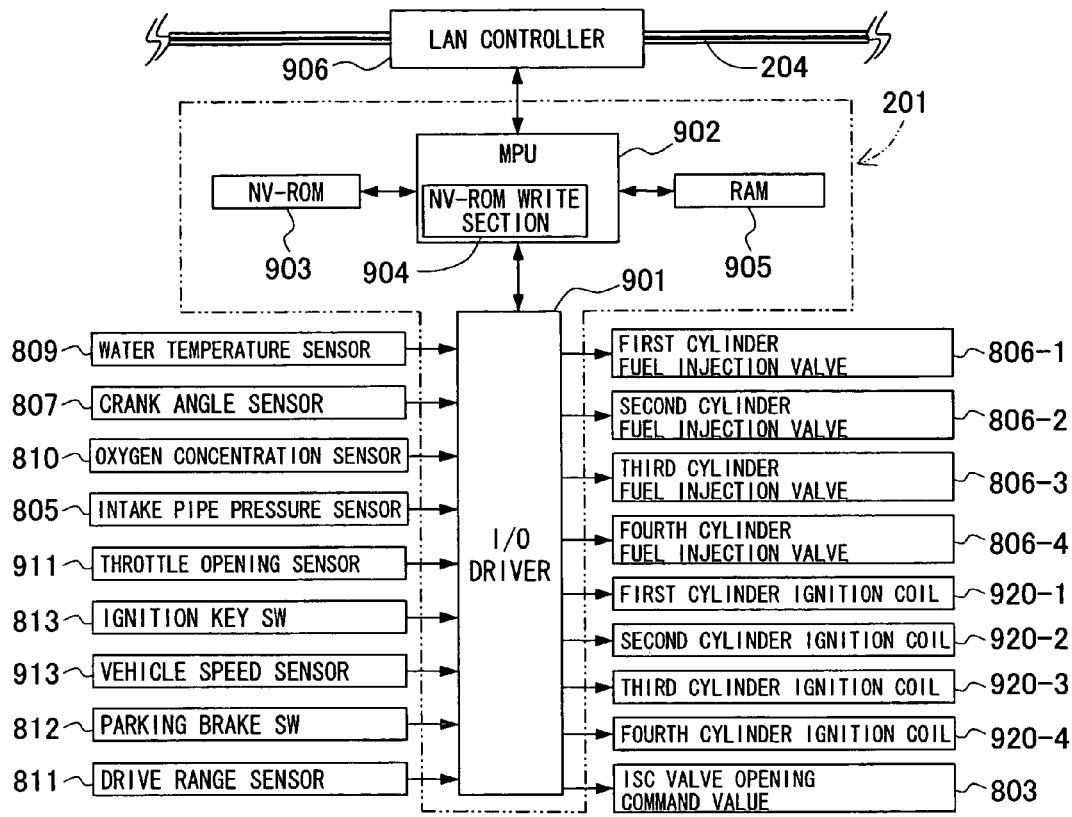
FIG. 9 shows a block diagram of an example of an engine control unit among vehicle-mounted control units in the update information communication system according to the invention.

FIG. 9 shows an internal configuration of the engine control unit 201 that is a vehicle-mounted control unit in the vehicle 200. The engine control unit 201 consists of a CAN-compatible microcomputer and includes an LSI I/O driver 901, an arithmetic processing unit (MPU) 902, a flash memory (NV-ROM) 903 for storing control procedures (control programs) and control constants for the arithmetic processing unit 902, and a volatile memory 905 for storing calculation results and the like from the arithmetic processing unit 902. The engine control unit 201 is connected to a vehicle-mounted LAN controller 906.

To the input side of the I/O driver 901 there are connected a throttle opening sensor 911, the intake manifold pressure sensor 805, the crank angle sensor 807, the water temperature sensor 809, the oxygen concentration sensor 810, a vehicle speed sensor 913, the drive range sensor 811, the parking brake switch 812, and the ignition key switch 813.

To the output side of the I/O driver 901 there are connected actuators (engine control actuators) for performing engine control, including the fuel injection valve 806, an ignition coil 920 provided in the ignition module 808, and the idle speed control valve (ISC) 803. Because the fuel injection valve 806 and the ignition coil 920 are provided for each cylinder, four fuel injection valves, namely, a first cylinder fuel injection valve 806-1 to a fourth cylinder fuel injection valve 806-4, and four ignition coils, namely, a first cylinder ignition coil 920-1 to a fourth cylinder ignition coil 920-4, are connected in the case of a four-cylinder engine.

The I/O driver 901 converts electric signals from the foregoing sensors and switches installed on the engine into signals for digital arithmetic processing, and then it converts the control signals for digital operation into drive signals for the foregoing engine control actuators.

The arithmetic processing unit 902 executes control programs stored in the flash memory 903, determines the engine state based on the signal for digital arithmetic processing from the I/O driver 901, calculates the fuel mass required by the engine, ignition timing, and the like based on the procedure previously specified by the control program, and outputs the thus calculated values to the foregoing I/O driver 901.

The arithmetic unit 902 contains a flash memory write section 904 that enables the reprogramming of the flash memory 903.

The volatile memory 905 may be connected to a back-up power supply for the purpose of saving memory contents even when the foregoing ignition key switch 813 is turned off and no power is supplied to the engine control unit 201. Further, the arithmetic unit 906 may contain the LAN controller 906.

Figure 10:
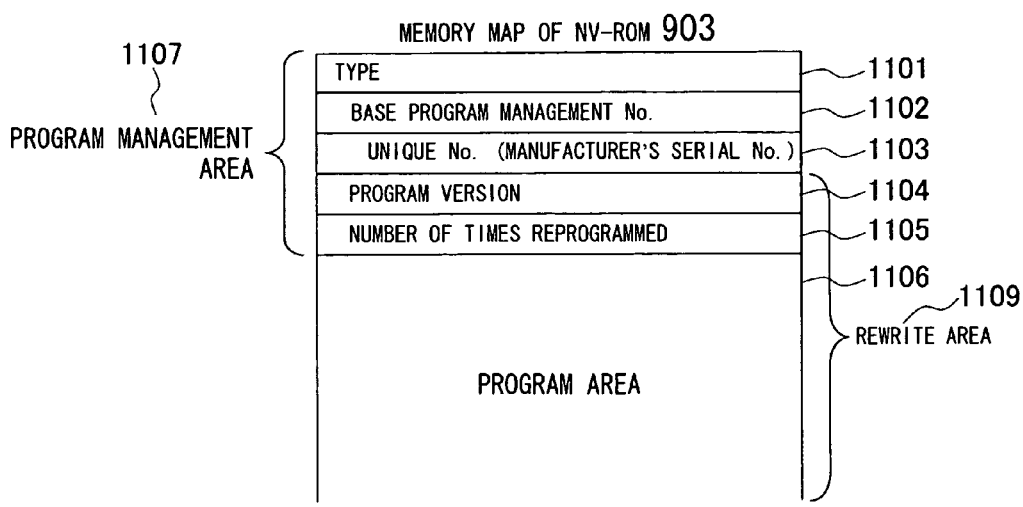
FIG. 10 shows a memory map structure of an example of a flash memory contained in the vehicle-mounted control unit of a vehicle in the update information communication system according to the invention.

An example of a memory map structure of the flash memory 903 will be described with reference to FIG. 10. The flash memory 903 is mapped with a program management area 1107 and a program area 1106. The program management area 1107 includes a type section 1101, a base program management number section 1102, a unique number (manufacturer's serial number) section 1103, a program version section 1104, and a number-of-program-reprogrammings section 1105. The base program management number 1102 is the management number of a default program upon initial release of the control unit. The memory map is composed of the program management area 1107 and a program area 1108. The program version section 1104, number-of-program-reprogrammings section 1105, and program area 1106 are program reprogramming areas.

Figure 11:
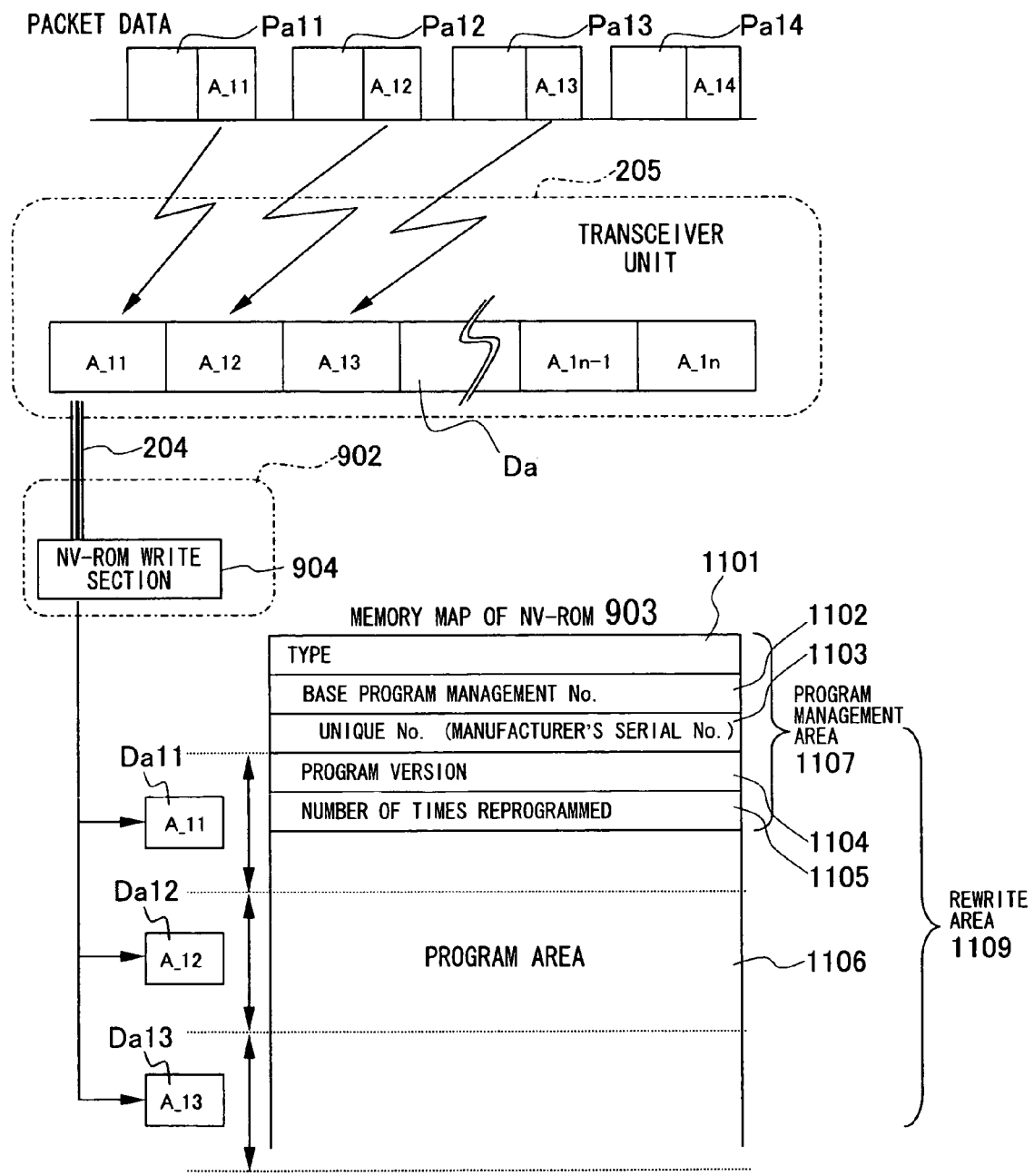
FIG. 11 shows an example of a mode of data reception and reprogramming at the vehicle end in the update information communication system according to the invention.

In the following, a mode of data reception and reprogramming at the vehicle 100 end in the update information communication system will be described with reference to FIG. 11. Packet data Pa11, Pa12, Pa13, Pa14 . . . transmitted from the base station 100 end are constructed as single consecutive data Da in the transceiver unit 205. The data Da is transmitted to a vehicle-mounted control unit, such as the MUP 902 in the E-ECU 201, via the vehicle-mounted LAN 204. The MPU 902 includes the flash memory write section 904, and the data Da is transferred thereto. The data Da is divided into data Da11, Da12, Da13 . . . , with which a reprogramming area 1109 of the flash memory 903 is rewritten.

Figure 12:
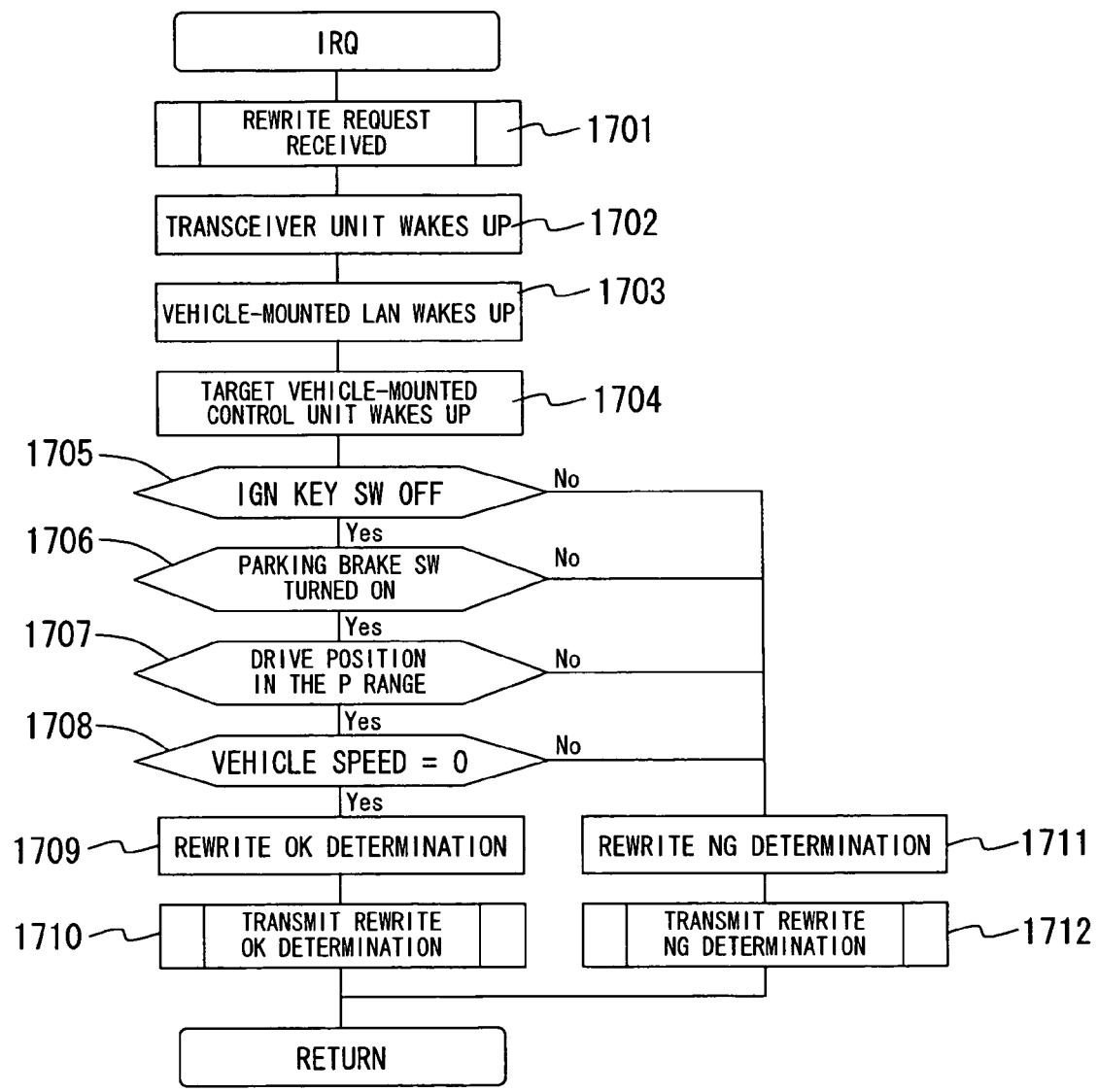
FIG. 12 shows a flowchart of a processing routine for a reprogramming OK/NG determination at the vehicle end in the update information communication system according to the invention.

In the following, a processing routine for a reprogramming OK/NG determination at the vehicle 200 end in the update information communication system will be described with reference to FIG. 12.

First, a reprogramming request is received (step 1701). The OK/NG determination processing routine is initiated upon reception of the reprogramming request, and then the transceiver unit 205 wakes up (step 1702). Subsequently, the vehicle-mounted LAN 204 and a vehicle-mounted control unit that is a reprogramming target wake up in sequence (steps 1702 and 1703). The present embodiment concerns an example where the engine control ECU 201 is the reprogramming target.

Next, whether the ignition key switch 813 is on or off is determined (step 1705). Whether the parking brake switch 812 is on or off is determined (step 1706). Whether the drive position detected by the drive range sensor 811 is in the P range or not is determined (step 1707). Then, whether the vehicle speed detected by vehicle speed sensor 913 is zero or not is determined (step 1708).

If the ignition key switch 812 is off, the parking brake switch 812 is on, the drive position of the automatic transmission is in the P range, and the vehicle speed is zero, it is determined that the vehicle 200 is parked, not in operation, and in an update-allowed state, namely, in a state in which reprogramming can be enabled (step 1709), and then a reprogramming OK determination message is transmitted to the base station 100 (step 1710).

In cases other than the above, that is, if any one of the above conditions including the ignition key switch 812 being off, the parking brake switch 812 being on, the drive position of the automatic transmission being in the P range, and the vehicle speed being zero is not satisfied, it is determined that a reprogramming is not allowed (step 1711) and a reprogramming NG determination message is transmitted to the base station 100 (step 1712).

Figure 13:
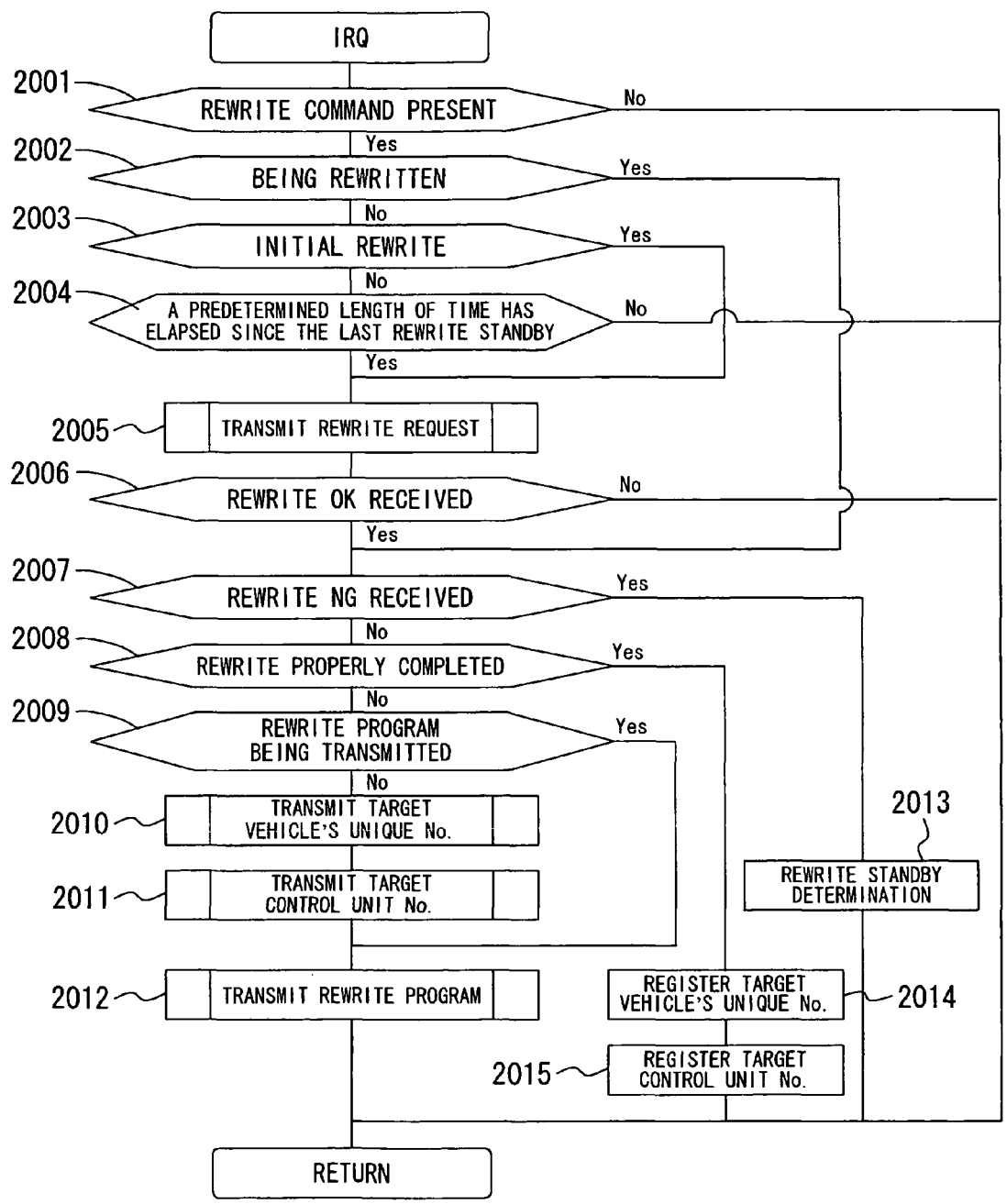
FIG. 13 shows a flowchart of a reprogramming processing routine at the base station end in the update information communication system according to the invention.

Hereafter, a reprogramming processing routine at the base station 100 end in the update information communication system will be described with reference to FIG. 13.

First, whether a reprogramming command is present or not is determined (step 2001). If a reprogramming command is not present, the routine comes to an end.

If the presence of a reprogramming command is determined, whether a program is currently being rewritten or not is determined (step 2002). If the program is being rewritten, the routine branches so as to allow the reprogramming to proceed. If the program is not being rewritten, whether or not the reprogramming will be taking place for the first time is determined (step 2003). If the reprogramming will not be taking place for the first time, whether or not a predetermined period of time has elapsed since the last reprogramming standby is determined (step 2004). If more than the predetermined period of time has elapsed, a reprogramming request is transmitted (step 2005). In contrast, if more than the predetermined period of time has not elapsed, the routine comes to end. Next, whether a reprogramming OK determination is received from the vehicle 100 end is determined (step 206). If a reprogramming NG determination is received, the routine comes to an end. On the other hand, if a reprogramming OK determination is received, the routine proceeds to a step of transmitting a reprogramming program.

Then, whether or not a reprogramming NG determination is received from the vehicle 100 end is determined (step 2007). If a reprogramming NG determination is received, a reprogramming standby determination is carried out (step 2013).

If a reprogramming NG determination is not received, whether the reprogramming is properly completed is determined (step 2008). If the reprogramming is properly completed, the target vehicle's unique number and the target control unit number are registered in the target database 102 (steps 2014 and 2015).

If the reprogramming is not completed, whether the transmission of the reprogramming program will be taking place for the first time is determined (step 2009). If the transmission of the reprogramming program will not be taking place for the first time (the first packet of the reprogramming program), the target vehicle's unique number and the target control unit number are transmitted (steps 2010 and 2011), so as to identify the vehicle and vehicle-mounted control unit to be rewritten. If the reprogramming program will not be taking place for the first time (packets after the first reprogramming program packet), the reprogramming program is continuously transmitted (step 2012).

Figure 14:
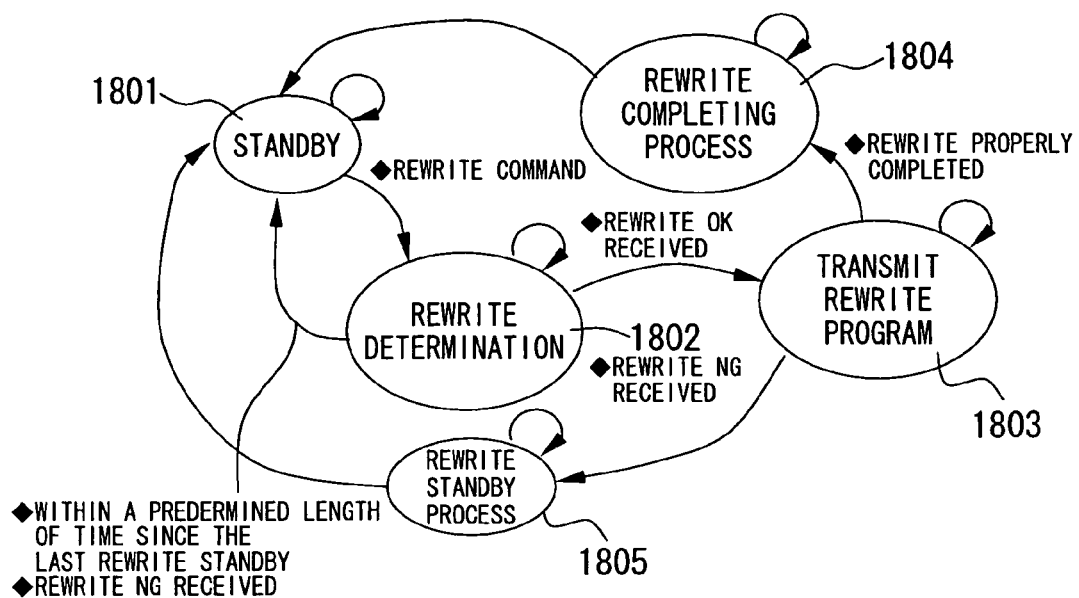
FIG. 14 shows a state transition diagram of an example of state transition at the base station end in the update information communication system according to the invention.

FIG. 14 shows an example of transition of the state of the base station 100 in the update information communication system. Block 1801 shows the standby state. If a reprogramming command is given, the state transitions to a reprogramming determination state in block 1802.

At block 1802, if a reprogramming NG determination is received from the vehicle end or a predetermined period of time has not elapsed since the last reprogramming standby, the state goes back to the standby state in block 1801. In contrast, if a reprogramming OK determination is received from the vehicle end, the state transitions to block 1803 so as to transmit a reprogramming program.

Upon transmitting the reprogramming program and receiving notice of proper completion of the reprogramming, a reprogramming completion process is carried out at block 1804. At this point, the update of the above-described database 102 at the base station 100 end is carried out. If a reprogramming NG signal is received at block 1803, a reprogramming standby process is carried out at block 1805. At this point, notice of the reprogramming standby state is recorded in the above-described database 102. Then, the state transitions to the standby process in block 1801.

Figure 15:
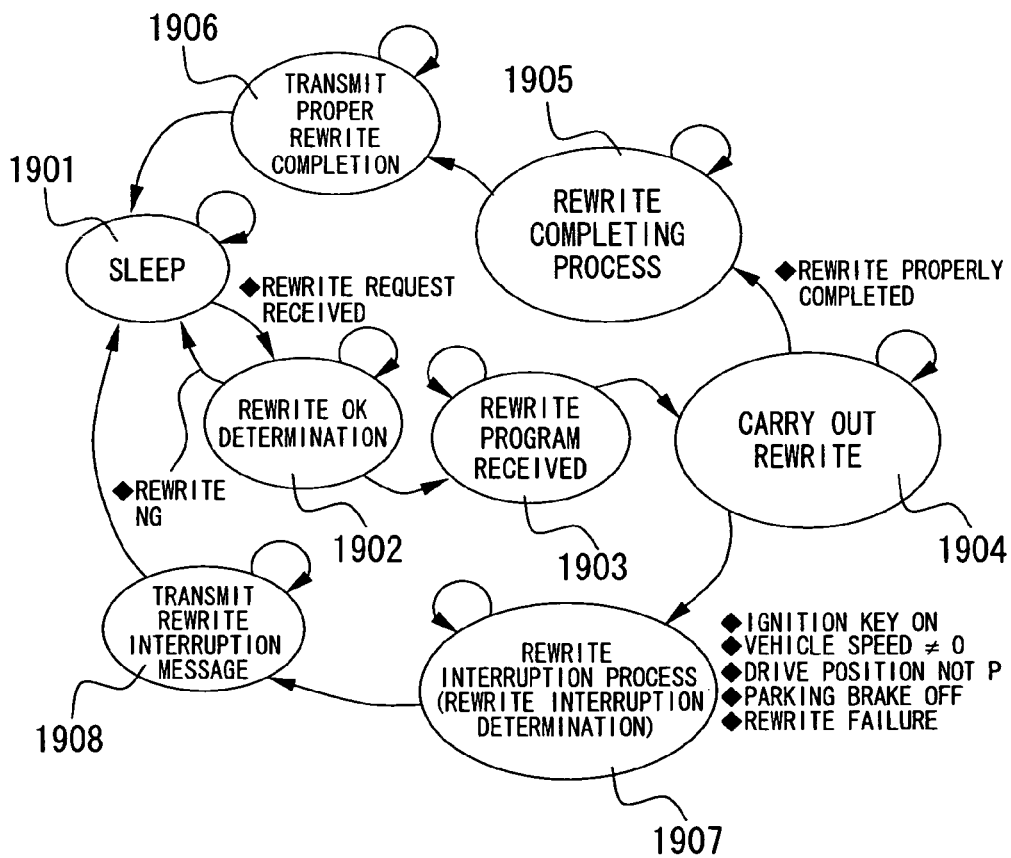
FIG. 15 shows a state transition diagram of an example of state transition at the vehicle end in the update information communication system according to the invention.

FIG. 15 shows an example of transition of the state of the vehicle 100 in the update information communication system. In the embodiment, normally, the vehicle 100 is in a stopped state with its ignition key turned off, and the system at the vehicle end is in a sleep state as shown in block 1901.

Upon receiving a reprogramming request from the base station 100 end, the state transitions to block 1902 so as to determine whether reprogramming is approved or not. At this point, if a reprogramming NG determination is made, the state transitions back to block 1901. If a reprogramming OK determination is made, the state transitions to block 1903 and receives a reprogramming program.

Upon completing reception of the reprogramming program, the state transitions to block 1904, so as to carry out the reprogramming. If the reprogramming is properly completed, the state transitions from block 1905 to block 1906. After a reprogramming completion process is carried out and a notice of proper reprogramming is transmitted, the state transitions back to the initial state in block 1901.

During the program reprogramming at block 1904, if the ignition key switch is switched on, the vehicle speed is not zero anymore, the drive position is changed from the parking, the parking brake is switched off, or the reprogramming fails halfway through, for example, the state transitions to block 1907 so that a reprogramming interruption process is carried out. The reprogramming interruption process involves storing, in the vehicle-mounted control unit, information about to what extent the reprogramming has been carried out.

Then, a notice of reprogramming interruption is transmitted at block 1908, and the state goes back to the initial state in block 1901.

In accordance with the invention, programs or data in the vehicle-mounted control unit in the target vehicle can be updated without transporting the vehicle to a dealer, for example. Further, management man-hours can be significantly reduced by managing the update status of programs and data of the vehicle-mounted control unit in the target vehicle via databases.

Since such update is automatically carried out for all the vehicles to be updated at the instruction of the base station 100 managed by an automobile manufacturer or a dealer, the vehicle-mounted control units are always reliably updated without placing a burden on vehicle users. Thus, vehicle-mounted control units are always maintained in its optimum state or in a better state, which leads to optimum states of operability, fuel consumption, and exhaust gas properties.

Furthermore, the vehicle-mounted control unit can be prevented from being kept in a non-optimum state due to user-side problems, such as when the user either forgets to or decides not to update.

Figure 16:
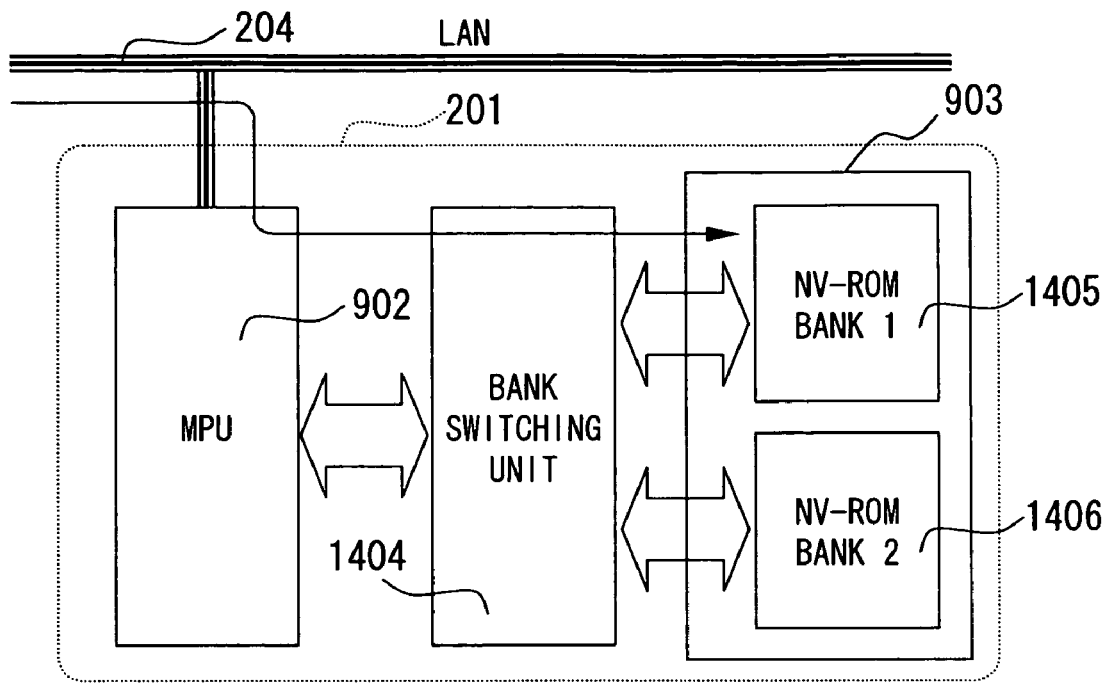
FIG. 16 shows an example of a flash memory structure in a vehicle-mounted control unit at the vehicle end in the update information communication system according to the invention.

FIG. 16 shows another example of the flash memory structure of the vehicle-mounted control unit at the vehicle 100 end in the update information communication system according to the invention. The vehicle-mounted LAN 204 is connected to the MPU 902 in the vehicle-mounted control unit followed by a bank switching unit 1404 and flash memory banks (first and second banks) 1405 and 1406.

In the figure, the program data of the flash memory bank 1405 is being rewritten. Until the reprogramming is properly completed, the vehicle-mounted control unit, such as the E-ECU 201, performs control with the program and data in the flash memory bank 1406.

Once the program reprogramming of the flash memory bank 1405 is properly completed, the E-ECU 201 starts to perform control with the program and data in the flash memory bank 1405.

With the use of such bank-switching-type flash memory, programs and data can be updated at any time.

Figure 17:
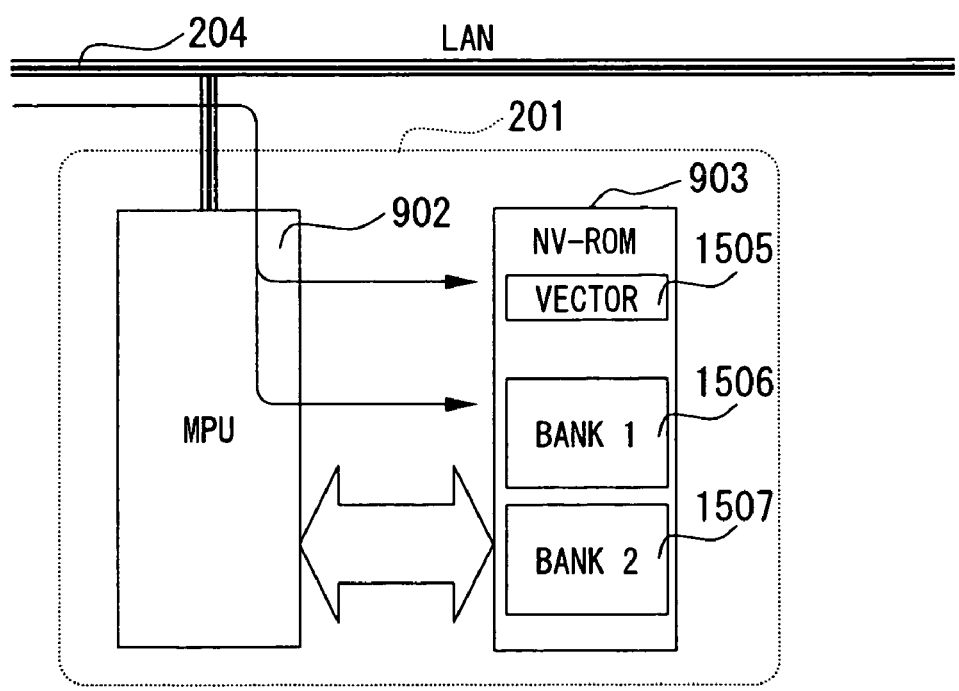
FIG. 17 shows another example of a flash memory structure in the vehicle-mounted control unit at the vehicle end in the update information communication system according to the invention.

FIG. 17 shows another example of the flash memory structure in the vehicle-mounted control unit at the vehicle 100 end in the update information communication system of the invention. The inside of the flash memory 903 is mapped with a program vector 1505, a first bank 1506, and a second bank 1507.

In the figure, the program data of the bank 1506 is being rewritten. Until the reprogramming is properly completed, the vehicle-mounted control unit, such as the E-ECU 201, performs control with the program and data of the bank 1507.

Once the program reprogramming of the bank 1506 is properly completed, the contents of the program vector 1505 are rewritten, and the E-ECU 201 starts to perform control with the program and data of the first bank 1506. In this case, too, programs and data can be updated at any time.

Figure 18:
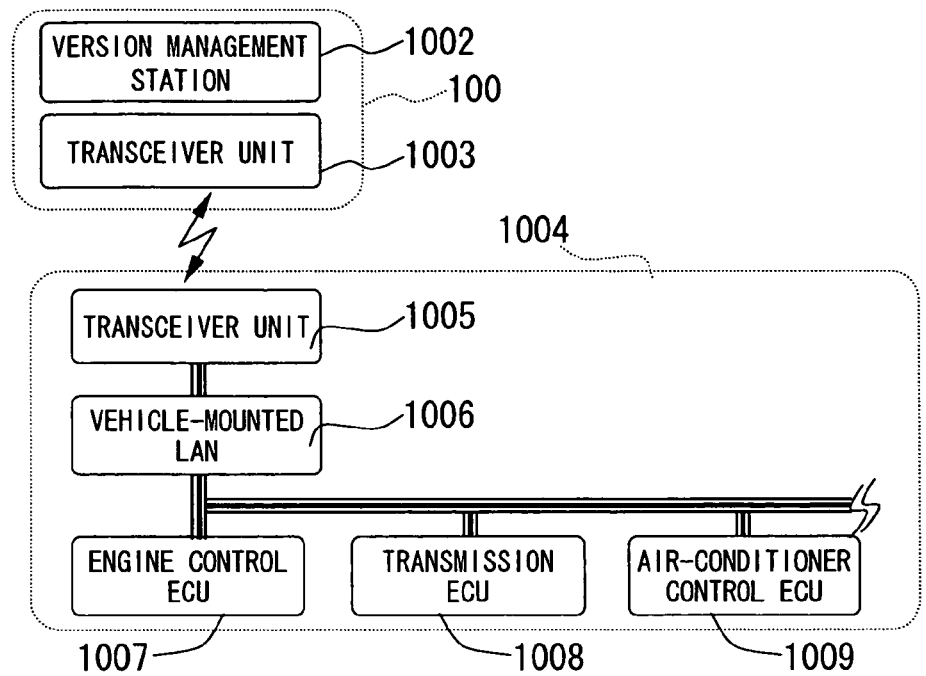
FIGS. 18 to 20 show diagrams of other examples of the structure of the base station end and the vehicle end in the update information communication system according to the invention.

FIG. 18 shows an example of the structure of the base station 100 end and the vehicle 200 end in the update information communication system.

The base station 100 includes a version management station 1002 for programs and the like, and a transceiver unit 1003.

The vehicle 200 includes a transceiver unit 1005, a vehicle-mounted LAN 1006, an engine control ECU 1007, a transmission ECU 1008, and an air-conditioner control ECU 1009, all of which are connected to one another via the LAN. In the present embodiment, three vehicle-mounted control units are connected through the LAN. However, it is possible to connect more control units.

Figure 19:
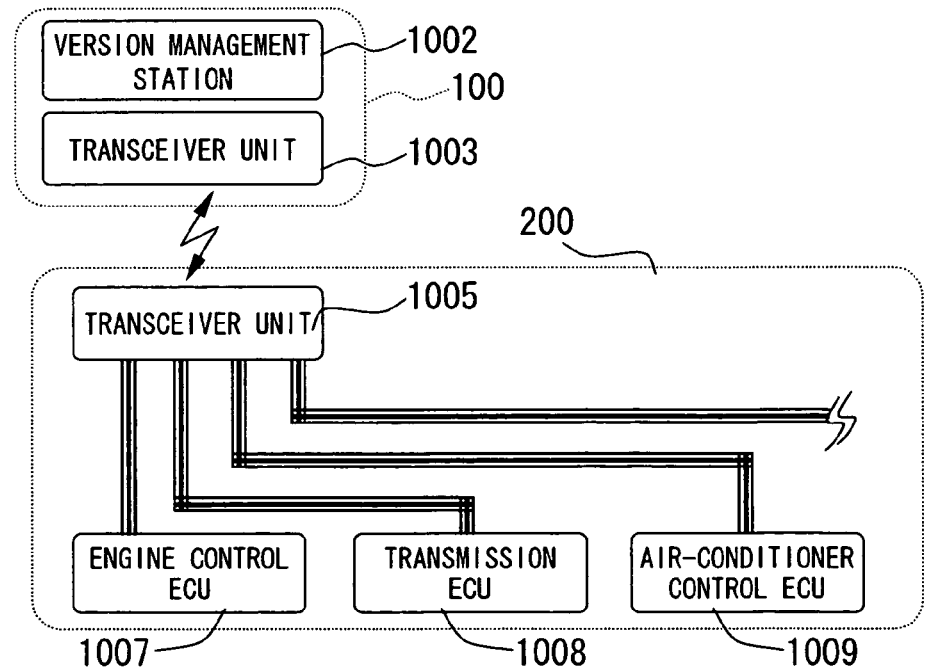
Figure 20:
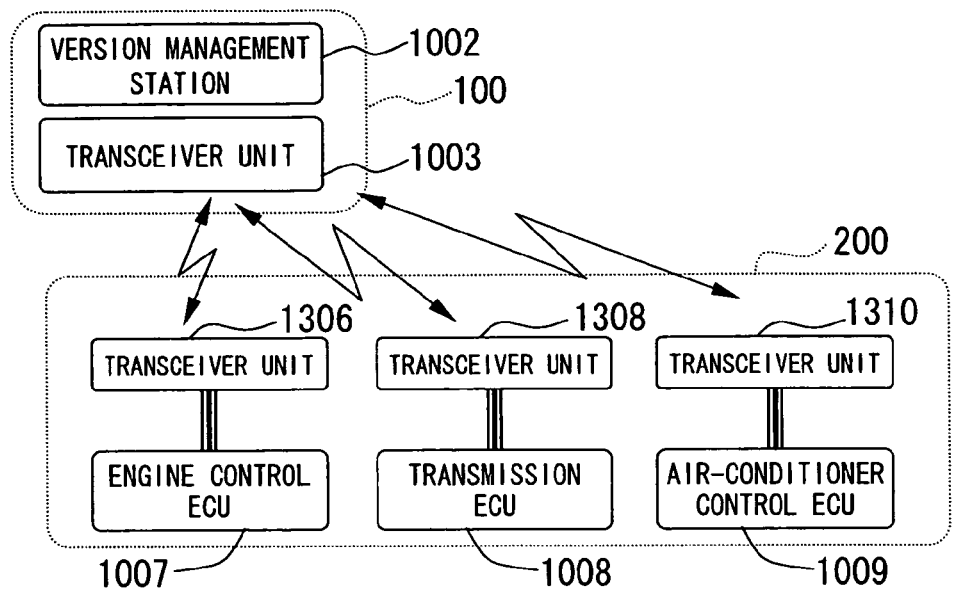

FIGS. 19 and 20 show other examples of the structure of the base station 100 end and the vehicle 200 end in the update information communication system.

In an example of the structure shown in FIG. 19, an engine control ECU 1206, a transmission 1207, and an air-conditioner control ECU 1208 that are mounted in the vehicle 200 are connected to the transceiver unit 1005 directly without the vehicle-mounted LAN.

In an example of the structure shown in FIG. 20, the engine control ECU 1007, the transmission ECU 1008, and the air-conditioner control ECU 1009 are individually connected to transceiver units 1306, 1308 and 1310, respectively. Alternatively, individual transceivers may transfer data to a single vehicle-mounted transceiver that transmits data to the base station 100 end all together (via Bluetooth or wireless LAN).

Figure 21:
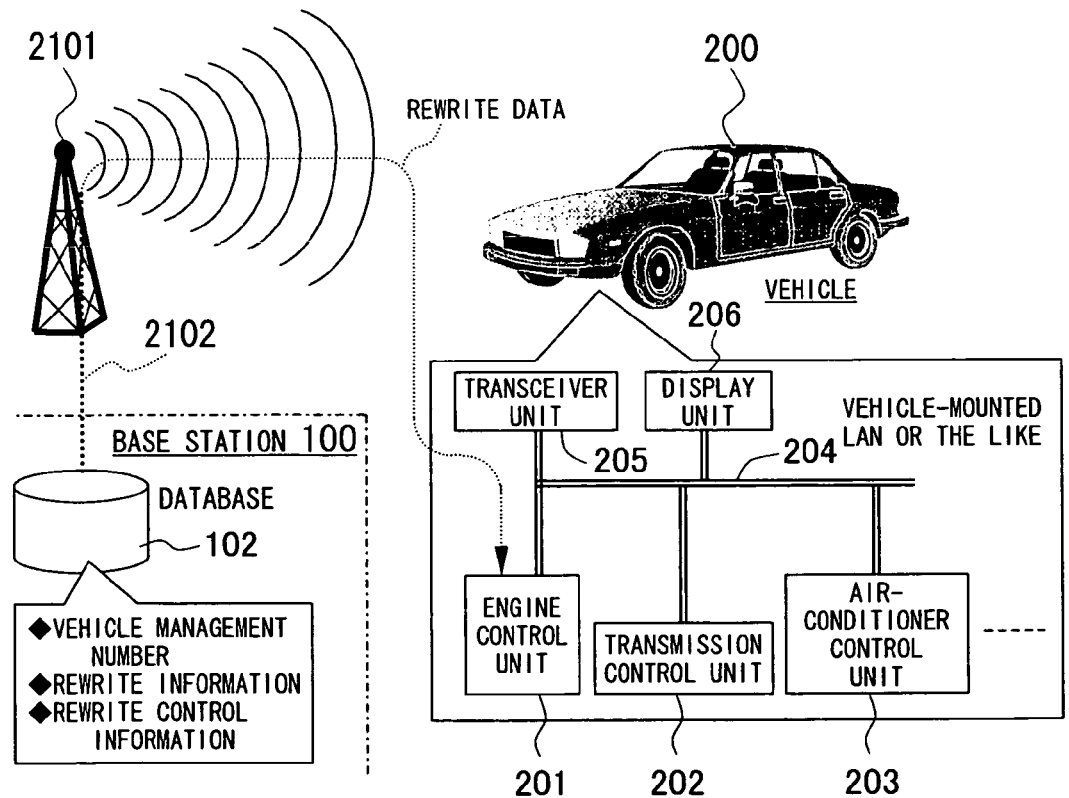
FIG. 21 shows a diagram for explaining another example of the overview of the update information communication system according to the invention.

In the above-described embodiment, the base station 100 is equipped with the transceiver 103 and the database 102. However, as shown in FIG. 21, the base station 100 may be equipped with only the database 102, so as to transmit and receive data with a transceiver 2101 via wireless or wired communication 2102 (the Internet, telephone lines, dedicated lines, or the like).

The invention claimed is:

1. An information updating method for vehicle-mounted control units, said method comprising:
when an updating event occurs, an information management base station transmitting a query to all vehicles under its management regarding whether or not a vehicle-mounted control unit that needs to be updated by the information management base station unit is present thereon;
said information management base station selecting vehicles to be updated based on the replies from the individual vehicles; and
said information management base station updating only the selected vehicles by updated contents divided into packets being transmitted to respective vehicle-mounted control units.

2. The method according to claim 1, wherein:
each vehicle mounted control unit determines whether the vehicle is in an update-allowed state;
said replies include information regarding an outcome of said determination; and
each vehicle is updated only when it is in an update-allowed state.

3. The method according to claim 2, wherein said update-allowed state comprises a state in which the vehicle is parked and not in operation.

4. The method according to claim 1, wherein said query is transmitted by said information management base station, simultaneously to all vehicles under its management, via a broadcasting system.

5. An information updating method for vehicle-mounted control units, comprising:
an information management base station unit transmitting information relating to an information update via wireless communication;
receiving the transmitted information on a vehicle;
said vehicle determining whether or not the information update is necessary for the vehicle, based on the information received by the vehicle;

said vehicle transmitting the determination result from the vehicle to the information management base station unit;

said information management base station unit transmitting update information divided into a packet to said vehicle via wireless communication only if the information update is necessary for the vehicle; and reprogramming the vehicle-mounted control unit based on the transmitted update information.

6. The method according to claim 5, wherein:

said vehicle further determines whether it is in an update-allowed state; and said information management base station transmits said update information only when the vehicle is in an update-allowed state.

7. The method according to claim 6, wherein said update-allowed state comprises a state in which the vehicle is parked and not in operation.

8. An update information communication system comprising:

an information management base station unit; and a vehicle that can bidirectionally and wirelessly communicate with said information management base station; wherein, when an updating event occurs, the information management base station unit transmits a query to all the vehicles under its management regarding the presence or absence of vehicle-mounted control units that need to be updated;

said information management base station selects vehicles to be updated based on replies from the individual vehicles; and said information management base station updates only those vehicles that need to be updated, by updated contents divided into packets being transmitted to respective vehicle-mounted control units via wireless communication.

9. The method according to claim 8, wherein said query is transmitted by said information management base station, simultaneously to all vehicles under its management, via a broadcasting system.

10. An update information communication system comprising:

an information management base station unit;

a vehicle having a vehicle mounted control unit; and a bidirectional wireless communication link between said information management base station unit and the vehicle;

wherein:

information relating to an information update is transmitted from the information management base station via wireless communication, and is received by the vehicle;

whether or not an information update is necessary for the vehicle is determined at the vehicle end based on the received information;

the determination result is transmitted from the vehicle to the information management base station unit;

the update information is transmitted from the information management base station unit to the vehicle, wherein the update information is transmitted in a packet to the vehicle-mounted control unit via wireless communication only if the information update is necessary for the vehicle; and information of the vehicle-mounted control unit is rewritten.

11. The update information communication system according to claim 10, wherein the information for the reprogramming comprises at least one of programs and control constants for the vehicle-mounted control units.

12. The update information communication system according to claim 10, wherein the information transmitted from the information management base station unit to the vehicle includes management information concerning the vehicle-mounted control unit.

13. The update information communication system according to claim 10, wherein information for reprogramming programs and data in the vehicle-mounted control unit is transmitted to the vehicle only when it is in an update-allowed state.

14. The update information communication system according to claim 13, wherein said vehicle is in an update-allowed state only when it is parked and not in operation.

15. The update information communication system according to claim 10, wherein:

the information management base station unit comprises a database in which update information and vehicle information for a plurality of types of vehicles are stored; and the information management base station unit selects specific update information from the database based on the vehicle information.

* * * * *